United States Patent [19]
Storch

[11] Patent Number: 5,632,576
[45] Date of Patent: May 27, 1997

[54] CUTTING PLATE FOR A BALL HEAD MILLER

[75] Inventor: Helmut Storch, Rothenburg, Germany

[73] Assignee: Widia Heinlein GmbH, Lichtenau, Germany

[21] Appl. No.: 535,183

[22] PCT Filed: Apr. 11, 1994

[86] PCT No.: PCT/DE94/00400

§ 371 Date: Oct. 16, 1995

§ 102(e) Date: Oct. 16, 1995

[87] PCT Pub. No.: WO94/23873

PCT Pub. Date: Oct. 27, 1994

[30] Foreign Application Priority Data

Apr. 16, 1993 [DE] Germany ............... 43 12 401.1

[51] Int. Cl.⁶ ..................................... B23C 5/14
[52] U.S. Cl. ............ 407/32; 407/42; 407/54; 407/62; 407/114; 408/228
[58] Field of Search ............... 407/35, 42, 43, 407/46, 57, 61, 62, 32, 54, 114; 408/228

[56] References Cited

U.S. PATENT DOCUMENTS 4,251,172  2/1981  Storch ................... 407/62
4,623,285  11/1986  Costil ................... 407/62
4,883,391  11/1989  Tsujimura et al. ......... 407/62
4,934,881  6/1990  Tsujimura et al. ......... 407/42
5,348,426  9/1994  Krupp ................... 407/65

FOREIGN PATENT DOCUMENTS 59-214510 A  12/1984  Japan.
1146665  6/1989  Japan.
4146014  5/1992  Japan.
1 136 305  12/1968  United Kingdom.
2 082 102  3/1982  United Kingdom.

*Primary Examiner*—M. Rachuba
*Assistant Examiner*—Kenneth J. Hansen
*Attorney, Agent, or Firm*—Herbert Dubno; Andrew Wilford

[57] ABSTRACT

A cutting plate for a ball-head finish miller has a support body of hard metal centered on an axis and having a pair of oppositely directed and symmetrically oriented faces each formed with a respective substantially circularly segmental recess of a predetermined depth. A pair of substantially identical and substantially circularly segmental cutting inserts are each secured to a respective one of the faces in the respective recess and each have a respective cutting layer forming a cutting edge. The inserts and their edges are symmetrical with respect to the axis and are each of a thickness substantially less than the depth of the respective recess so that each forms a chip cavity on the respective face.

12 Claims, 2 Drawing Sheets

CUTTING PLATE FOR A BALL HEAD MILLER

CROSS REFERENCE TO RELATED APPLICATIONS

This application is the US national phase of PCT application PCT/DE94/00400 filed 11 Apr. 1994 with a claim to the priority of German application P 43 12 401.1 filed 16 Apr. 1993.

FIELD OF THE INVENTION

The invention relates to a cutting plate and in particular to such a cutting plate intended for use in a ball-head finish miller used for copy milling.

BACKGROUND OF THE INVENTION

Cutting plates have been known for a long time and have a support body which is e.g. made of a hard metal. The cutting capacity of the miller depends on the quality of its cutting edge and inserts are already known which are provided with a particular cutting layer or cutting-material layer forming the cutting edge. The manufacture of these inserts with a cutting layer only a few tenths of millimeter thick is extremely expensive and therefore associated with high costs.

OBJECT OF THE INVENTION

It is an object of the invention to provide a cutting plate which is particularly usable for ball-head finish millers, which gives the ball-head finish miller a high cutting capacity, and which is generally relatively cheap to manufacture.

SUMMARY OF THE INVENTION

These objects are achieved by the invention in that at least two symmetrically arranged inserts also of hard metal and serving as supports are provided each having a cutting layer or cutting-material layer applied to it and forming the cutting edge, the inserts being arranged on opposite sides forming support faces of the cutting-plate support body.

Such a cutting plate using two inserts (blanks) and having two cutting edges is mounted on diametrally opposite sides of the head end of the ball-head finish miller. Of the two inserts on the cutting plate as a rule only the cutting edge of one insert is making contact so that a substantially longer service life can be obtained than in the known similar ball-head finish millers with only a single cutting edge.

According to further features of the invention the inserts are substantially formed as circle segments and they are mounted in substantially circularly segmental seats on the periphery of the cutting-plate support body. Except for the cutting layer or cutting-material layer forming the cutting edge, the inserts consist of the same hard metal as the cutting-plate support body so that the inserts can be e.g. soldered thereto. As a result of their circularly segmental shape the inserts are relatively small bodies and for this reason inexpensive. Meanwhile the cutting layer or cutting-material layer covers the entire welded-in piece. A partial coating is also possible.

BRIEF DESCRIPTION OF THE DRAWING

The invention is more closely described in the following with reference to an embodiment that is shown in the drawing. Therein.

SPECIFIC DESCRIPTION

Figure 1:
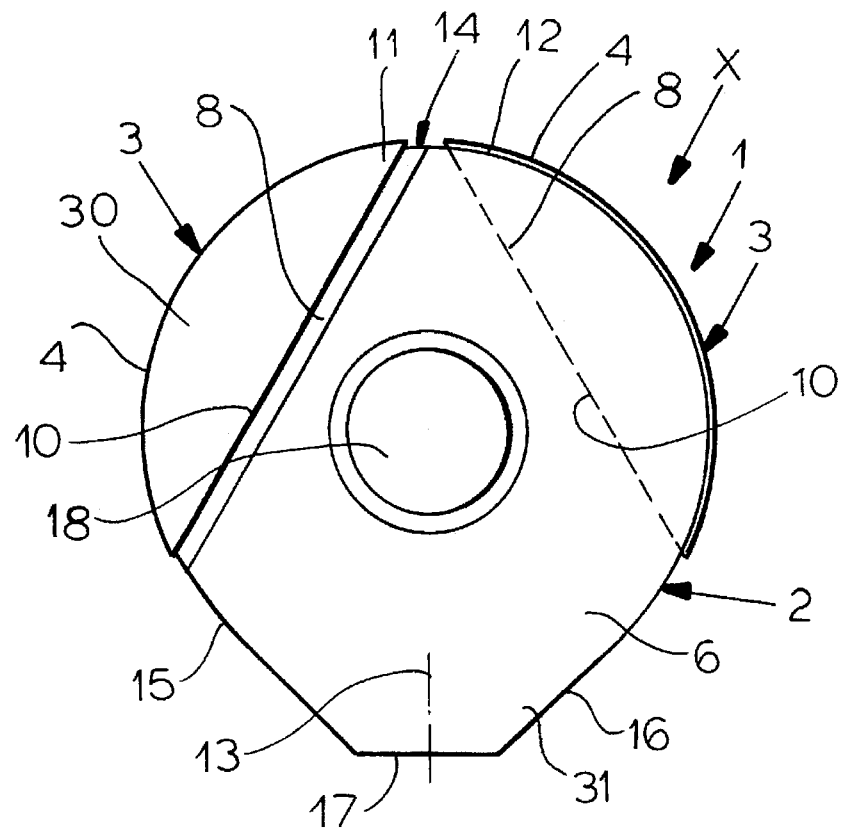
FIG. 1 is a large-scale view of a cutting plate.
Figure 2:
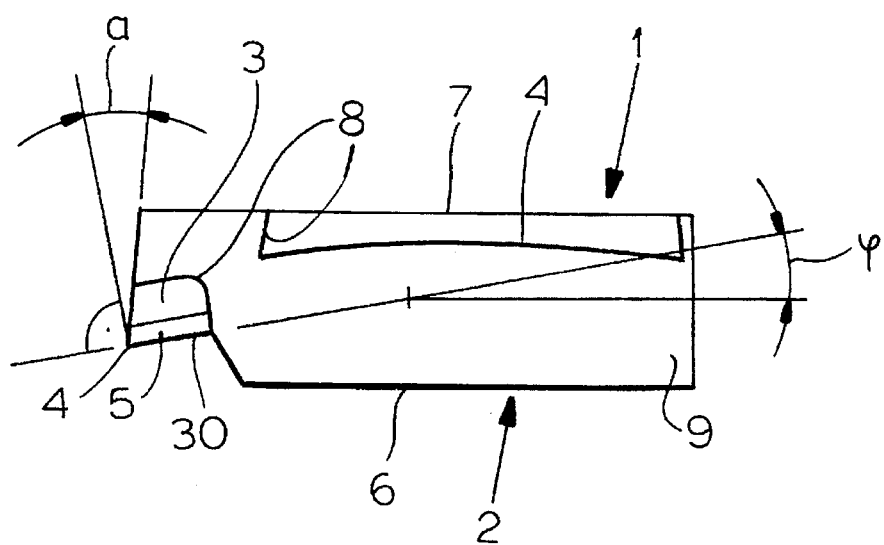
FIG. 2 is a view of the cutting plate taken in the direction of arrow X of FIG. 1.

A cutting plate 1 comprises according to the embodiment shown in FIG. 1 a cutting-plate support body 2 and two inserts 3 which each support a cutting or cutting-material layer 5 forming the cutting edge 4. The inserts 3 are as shown in FIGS. 1 and 2 mounted on support faces 6 and 7 formed on opposite sides of the cutting-plate support body 2 and are in recesses 8 which correspond in shape and size to the shape and size of the inserts 3. The recesses 8 also form chip spaces.

The inserts 3 are formed at least generally as circle segments and the recesses 8 on the periphery 9 of the cutting-plate support body 2 are similarly shaped.

The inserts 3 each have an arcuate cutting edge 4 and a secant-forming edge 10. The secantal edges 10 of the inserts 3 are arranged on the cutting-plate support body at an acute angle to each other. In addition they are arranged with their ends 11 and 12 immediately adjacent each other. Finally the segmental inserts 3 lie with their secantal edges 10 symmetrical to a main axis 13 of the support body as shown in FIG. 1.

Finally FIG. 1 shows how the cutting edges 4 of the two inserts together define a circular or nearly circular periphery extending over somewhat more than 180° and how even the cutting-plate support body 2 has a circular or nearly circular periphery 14 extending in section over 180° from which extend symmetrically converging edges 15 and 16 and finally a base edge 17 bridging them. In the view according to FIG. 1 the cutting-plate support body 2 thus has the general shape of a hot-air balloon provided with a throughgoing hole 18 for a mounting screw for mounting on the head end 20 of a ball-head finish miller 19 according to FIG. 3.

The cutting plate 1 is mounted on the head end 20 of the ball-head finish miller 19 in a recess 21 which extends as a diametral groove across the head end 20. Thus the edges 15 and 16 of the cutting-plate support body 2 lie on corresponding flanks 22 and 23 of the recess 21. According to FIG. 3 after mounting of the cutting plate 1 in the ball-head finish miller the two inserts 3 are in a diametral position relative to this head end 20.

The cutting layer 5 or cutting-material layer can be a CBN (cubic boron nitride) layer or a PCD (polycrystalline diamond) layer. Such layers are vaporized, sintered, or otherwise manufactured to produce the insert on a hard-metal carrier. Another material can be applied as the cutting layer 5 or cutting material layer. Basically it is also possible that the cutting layer 5 or cutting-material layer is a ceramic layer which is secured in an appropriate manner on the inserts 3. In addition the cutting layer 5 or cutting-material layer consisting of CBN or PCD can also be covered with a wear-resisting layer, e.g. aluminum oxide ($Al_2O_3$).

The cutting layer 4 or the cutting-material layers 5 serve also for forming the cutting surfaces 30.

Finally the invention is not restricted to use with a ball-head finish miller. The cutting plates according to the invention are usable with any ball-head miller and basically are usable with other tools where the form and shape of the cutting edges allow this.

According to the embodiment a single cutting plate 1 is provided on the head end 20 of the ball-head finish miller 10, where the free angle α can be between 2° and 20° and the angle of twist β can be between 2° and 15°.

The adjacent ends 11 and 12 of the two inserts according to the embodiment are closely spaced as shown in FIG. 1. They do not touch.

The cutting edges 4 extend not only circularly or arcuately circumferentially according to FIG. 1, but also extend according to the embodiment preferably arcuately transversely as shown in FIG. 2.

Figure 3:
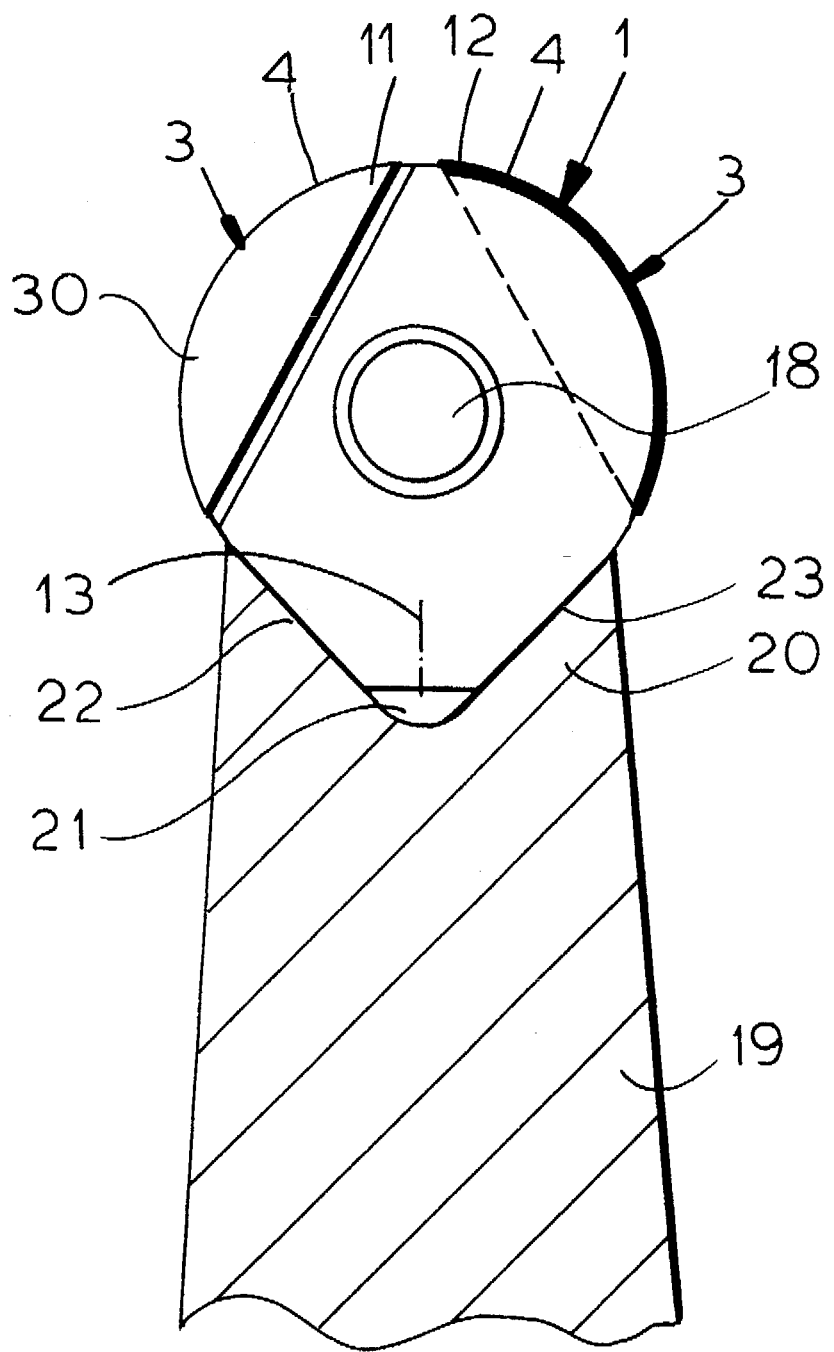
FIG. 3 is a partly broken-away side view of the end of a ball-head finish miller with an inset cutting plate also in enlarged scale.

The cutting-plate support body 2 is according to the embodiment shown in FIG. 1 a nearly circular circle-segment disk with a unitary outwardly extending triangular or trapezoidal extension 31 directed toward the ball-head finish miller 19 with the facing end of the ball-head finish miller 19 or the base edge there projecting beyond the circumference of a full circular disk. The groove-like seat 21 in the ball-head finish miller is finally of a depth and shape corresponding to that of the triangular or trapezoidal extension 31 as shown in FIG. 3. The seat 21 is thus not only groove-shaped but has flanks 22 and 23 inclined to the axis of the ball-head finish miller 19.

I claim:

1. A cutting plate adapted to be mounted on a ball head miller, the plate comprising:
   a support body of hard metal centered on an axis and having a pair of oppositely directed and symmetrically oriented faces each formed with a respective substantially circularly segmental recess of a predetermined depth; and
   a pair of substantially identical and substantially circularly segmental cutting inserts each integrally secured to a respective one of the faces in the respective recess and each having a respective cutting layer forming a cutting edge, the inserts and their edges being symmetrical with respect to the axis, the inserts each being of a thickness substantially less than the depth of the respective recess and each forming a chip cavity on the respective face.

2. The cutting plate defined in claim 1 wherein the inserts extend on the support body at an acute angle to each other and the cutting edges each have an end that is closely juxtaposed with the end of the other cutting edge.

3. The cutting plate defined in claim 2 wherein each cutting edge is circularly arcuate and each cutting insert has a secantal straight back edge, the back edges extending at an acute angle to each other.

4. The cutting plate defined in claim 1 wherein the inserts are soldered to the respective faces.

5. The cutting plate defined in claim 1 wherein each support body has a substantially circularly arcuate edge extending over more than 180° and an extension having a pair of outwardly converging straight side edges merging with respective ends of the arcuate edge.

6. The cutting plate defined in claim 1 wherein the cutting layer is of cubic boron nitride.

7. The cutting plate defined in claim 1 wherein the cutting layer is a ceramic.

8. The cutting plate defined in claim 1 wherein the cutting layer is of polycrystalline diamond.

9. The cutting plate defined in claim 8 wherein the wear-resistant material is aluminum oxide.

10. The cutting plate defined in claim 1 wherein the cutting layer is covered with a coating of a wear-resistant material.

11. The cutting plate defined in claim 1 wherein each support body is formed mainly as a circular disk unitarily formed with a laterally projecting extension.

12. The cutting plate defined in claim 11, further comprising
   a finish milling tool having a seat complementary to the extension.

* * * * *